(12) United States Patent
Kubo (10) Patent No.: US 9,703,730 B2
(45) Date of Patent: Jul. 11, 2017

(54) ARBITRATION CIRCUIT AND PROCESSING METHOD OF ARBITRATION CIRCUIT

(71) Applicant: SOCIONEXT INC., Yokohama-shi, Kanagawa (JP)

(72) Inventor: Yoshihiro Kubo, Wako (JP)

(73) Assignee: SOCIONEXT INC., Yokohama (JP)

( * ) Notice: Subject to any disclaimer, the term of this patent is extended or adjusted under 35 U.S.C. 154(b) by 277 days.

(21) Appl. No.: 14/605,678

(22) Filed: Jan. 26, 2015

(65) Prior Publication Data

US 2015/0227475 A1    Aug. 13, 2015

(30) Foreign Application Priority Data

Feb. 12, 2014    (JP) .................................. 2014-024456

(51) Int. Cl.
*G06F 13/16*    (2006.01)
*G06F 13/40*    (2006.01)

(52) U.S. Cl.
CPC ...... *G06F 13/1605* (2013.01); *G06F 13/1626* (2013.01); *G06F 13/1673* (2013.01); *G06F 13/4022* (2013.01)

(58) Field of Classification Search
CPC .. G06F 13/362; G06F 13/364; G06F 13/1605; G06F 13/18; G06F 13/1663; G06F 13/14; G06F 13/36
USPC .................................................. 710/240–244
See application file for complete search history.

(56) References Cited

U.S. PATENT DOCUMENTS

| | | | | |
|---|---|---|---|---|
| 5,996,036 A | * | 11/1999 | Kelly ...................... | G06F 13/16 709/208 |
| 6,442,631 B1 | * | 8/2002 | Neufeld .................. | G06F 13/18 710/107 |
| 6,654,837 B1 | | 11/2003 | Hill et al. | |
| 6,678,271 B1 | * | 1/2004 | Flinsbaugh ............. | H04L 47/30 370/392 |
| 6,832,308 B1 | * | 12/2004 | Sicaras .................. | G06F 9/3802 711/108 |
| 7,209,476 B1 | * | 4/2007 | Colloff .................. | H04L 49/208 370/360 |
| 7,302,510 B2 | * | 11/2007 | Fredrickson .......... | G06F 13/362 370/447 |

(Continued)

FOREIGN PATENT DOCUMENTS

JP    2000-267992 A    9/2000
JP    2003-521029 A    7/2003

(Continued)

*Primary Examiner* — Brian Misiura
(74) *Attorney, Agent, or Firm* — Arent Fox LLP (57) ABSTRACT

In an arbitration circuit, transactions output from a plurality of master circuits are stored in a first-in-first-out type first buffer, and when a high-priority transaction higher in priority than one of the stored transactions is output from one of the plural master circuits, a cancel request of a low-priority transaction lower in priority than the high-priority transaction, out of the stored transactions, is output to a second buffer in a slave circuit, and when the cancel request is successful, the high-priority transaction is output to the slave circuit, and after the high-priority transaction is output to the slave circuit, the low-priority transaction whose cancel request is successful is output to the slave circuit.

10 Claims, 9 Drawing Sheets

(56) References Cited

U.S. PATENT DOCUMENTS

| | | | |
|---|---|---|---|
| 7,603,512 B2* | 10/2009 | Seo | G06F 13/1626 |
| | | | 711/106 |
| 7,631,132 B1* | 12/2009 | Neuman | G06F 9/544 |
| | | | 370/230 |
| 8,184,860 B2* | 5/2012 | Muramatsu | H04N 5/772 |
| | | | 382/103 |

FOREIGN PATENT DOCUMENTS

| JP | 2006-185198 A | 7/2006 |
|---|---|---|
| JP | 2012-027577 A | 2/2012 |

* cited by examiner

ARBITRATION CIRCUIT AND PROCESSING METHOD OF ARBITRATION CIRCUIT

CROSS-REFERENCE TO RELATED APPLICATION

This application is based upon and claims the benefit of priority of the prior Japanese Patent Application No. 2014-024456, filed on Feb. 12, 2014, the entire contents of which are incorporated herein by reference.

FIELD

The embodiments discussed herein are directed to an arbitration circuit and a processing method of the arbitration circuit.

BACKGROUND

A multi-bus arbitration circuit has been known (for example, refer to Patent Document 1). When transfer destination buses of a plurality of requests do not conflict with each other, a transfer destination bus conflict determining part causes a data transfer executing part to execute data transfers for all the requests in parallel, and when they conflict with each other, leaves the processing to a transfer destination bus determining part. A request priority determining part in the transfer destination bus determining part compares priorities of request priority parameters regarding the plural requests to give an instruction to a cancel processing part in order to return a cancel to a bus arbitration circuit that has issued a low-priority request, and gives an execution instruction to the data transfer executing part in order to cause the execution of the data transfer of a high-priority request.

Further, a transaction queue for agent that operates according to a dynamic priority scheme has been known (for example, refer to Patent Document 2). The transaction queue operates according to a default priority scheme, and when a congestion event is detected, it uses a second priority scheme.

Further, there has been known a memory access control circuit that registers, in a queuing buffer, transactions each generated by a bus master and assigned an ID, and processes the transactions according to the order in which they are registered in the queuing buffer (for example, refer to Patent Document 3). A transaction detecting means recognizes the ID, and detects that a transaction from the bus master which influences performance by latency has been registered in the queuing buffer. When the transaction giving the influence is detected by the detecting means, a processing sequence change means processes this transaction first in precedence over transactions which are kept queuing.

Further, there has been known a bus connecting device that connects a first bus to which a memory storing various kinds of electronic data is connected and a second bus to which a plurality of control means accessing the memory are connected, and controls the accesses from the control means to the memory (for example, refer to Patent Document 4). A queuing means accumulates, in a queuing buffer, access requests to the memory which are transmitted from the control means, to sequentially process them. A bypass processing means processes a predetermined access request corresponding to predetermined processing requiring a real time property among the access requests to the memory which are transmitted from the control means, in precedence over the other access requests which are processed by the queuing means, by making the predetermined processing bypass the queuing buffer.

Patent Document 1: Japanese Laid-open Patent Publication No. 2000-267992
Patent Document 2: Japanese translation of PCT International Application Publication No. 2003-521029
Patent Document 3: Japanese Laid-open Patent Publication No. 2006-185198
Patent Document 4: Japanese Laid-open Patent Publication No. 2012-27577

In Patent Document 1, when transfer destination buses of a plurality of requests conflict with each other, an instruction is given to the cancel processing part in order to return a cancel to the bus arbitration circuit that has issued a low-priority request, and an execution instruction is also given to the data transfer executing part in order to cause the execution of the data transfer of a high-priority request. However, when there is no conflict, the data transfer executing part is made to execute the data transfers for all the requests in parallel, and accordingly a high-priority request is sometimes kept waiting until the processing of a low-priority request issued first is ended, and is not executed at once.

SUMMARY

An arbitration circuit includes: an interface circuit which stores transactions output from a plurality of master circuits in a first-in-first-out type first buffer and outputs the stored transactions stored in the first buffer to a slave circuit; and a control circuit which controls the interface circuit based on results of monitoring the transactions output from the plural master circuits, wherein, when a high-priority transaction higher in priority than one of the stored transactions is output from one of the plural master circuits, the interface circuit outputs, according to the control by the control circuit, a cancel request of a low-priority transaction whose priority is lower than the priority of the high-priority transaction, out of the stored transactions, to a first-in-first-out type second buffer which is in the slave circuit and in which the same transactions as the stored transactions are stored, and when the cancel request is successful, outputs the high-priority transaction to the slave circuit, and after outputting the high-priority transaction to the slave circuit, outputs, to the slave circuit, the low-priority transaction whose cancel request is successful.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

First Embodiment

Figure 1:
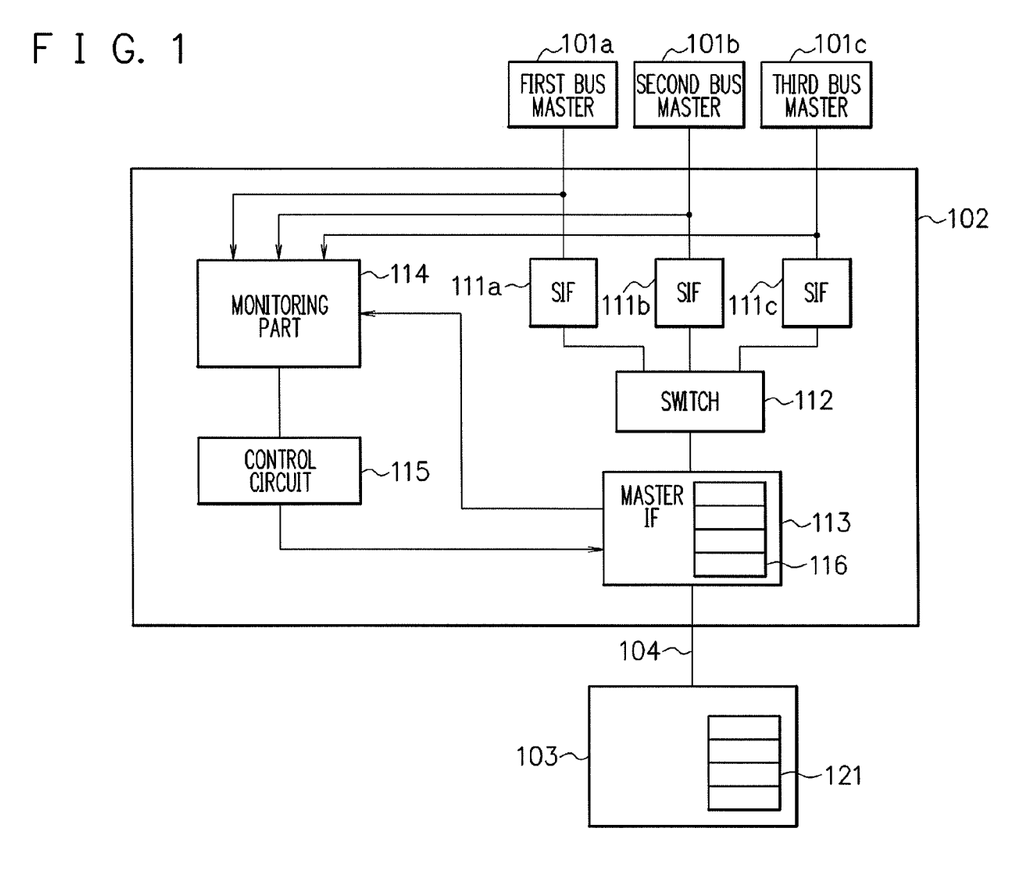
FIG. 1 is a diagram illustrating a configuration example of a processing system according to a first embodiment.

FIG. 1 is a diagram illustrating a configuration example of a processing system according to a first embodiment. The processing system has a plurality of bus master circuits 101a to 101c, an arbitration circuit (bus matrix circuit) 102, and a bus slave circuit 103. The arbitration circuit 102 has a plurality of slave interface (SIF) circuits 111a to 111c, a first switch circuit 112, a master interface circuit 113, a monitoring part 114, and a control circuit 115. The master interface circuit 113 has a first buffer 116. The bus slave circuit 103 has a second buffer 121.

The bus master circuits 101a to 101c are each capable of outputting a transaction to the bus slave circuit 103 via the arbitration circuit 102. The transaction is a request (instruction) for causing the bus slave circuit 103 to execute the processing. The bus slave circuit 103 is a processing circuit. For example, when the bus slave circuit 103 is a memory circuit, the transaction is a read request, a write request, or the like.

The slave interface circuit 111a receives the transaction output by the first bus master circuit 101a to transmit the input transaction to the first switch circuit 112. The slave interface circuit 111b receives the transaction output by the second bus master circuit 101b to transmit the input transaction to the first switch circuit 112. The slave interface circuit 111c receives the transaction output by the third bus master circuit 101c to transmit the input transaction to the first switch circuit 112.

The first switch circuit 112 is connected between the plural slave interface circuits 111a to 111c and the master interface circuit 113, and arbitrates the transactions input from the slave interface circuits 111a to 111c to output them to the master interface circuit 113. For example, when receiving the plural transactions from the slave interface circuits 111a to 111c at the same time, the first switch circuit 112 outputs the transactions serially to the master interface circuit 113 in descending order of priorities of the transactions. Further, when receiving one transaction from one of the slave interface circuits 111a to 111c, the first switch circuit 112 outputs the input transaction to the master interface circuit 113.

The priorities of the transactions are, for example, priorities of the bus master circuits outputting the relevant transactions. The transactions output by the first bus master circuit 101a and the second bus master circuit 101b are transactions with a low priority (low-priority transactions). The transaction output by the third bus master circuit 101c is a transaction with a high priority (high-priority transaction). The high-priority transaction output by the third bus master circuit 101c is higher in priority than the low-priority transactions output by the first bus master circuit 101a and the second bus master circuit 101b. Incidentally, the case where there are two-step priorities is described as an example, but there may be three-step priorities or more. For example, when receiving the transactions at the same time from the slave interface circuits 111a and 111c, the first switch circuit 112 first outputs the transaction input from the slave interface circuit 111c to the master interface circuit 113, and thereafter outputs the transaction input from the slave interface circuit 111a to the master interface circuit 113.

The master interface circuit 113 stores the transactions output from the first switch circuit 112 in the first-in-first-out (FIFO) type first buffer 116, and outputs the stored transactions stored in the first buffer 116 to the bus slave circuit 103. The first buffer 116 buffers the transactions on a first-in-first-out basis.

The monitoring part 114 detects whether or not a condition that the transaction output from one of the plural bus master circuits 101a to 101c is higher in priority than one of the transactions in the first buffer 116 is satisfied, and when the condition is satisfied, activates the control circuit 115. Then, the control circuit 115 controls the master interface circuit 113. Incidentally, since the transactions include identifiers (IDs) of the bus master circuits 101a to 101c being issuers, the monitoring part 114 is capable of recognizing the priorities based on the transactions.

Under the control by the control circuit 115, the master interface circuit 113 outputs, to the second buffer 121 in the bus slave circuit 103, a cancel request of the transaction which is in the first buffer 116 and lower in priority than the transaction output from one of the plural bus master circuits 101a to 101c.

Upon receiving the cancel request of the transaction, when the transaction corresponding to the cancel request has not been processed yet, the bus slave circuit 103 deletes the transaction corresponding to the cancel request from the second buffer 121, and outputs a signal indicating a cancel success of the transaction to the master interface circuit 113. When receiving the signal indicating the cancel success, the master interface circuit 113 outputs, to the bus slave circuit 103, the aforesaid high-priority transaction output from one of the plural bus master circuits 101a to 101c, and thereafter outputs the aforesaid transaction whose cancel is successful to the bus slave circuit 103 again.

Further, upon receiving the cancel request of the transaction, when the transaction corresponding to the cancel request is under processing, the bus slave circuit 103 outputs a signal indicating a processing end of the transaction to the master interface circuit 113 after finishing the processing of the transaction corresponding to the cancel request. Upon receiving the signal indicating the processing end of the transaction from the bus slave circuit 103, the master interface circuit 113 deletes the transaction whose processing is finished from the first buffer 116.

Figure 2:
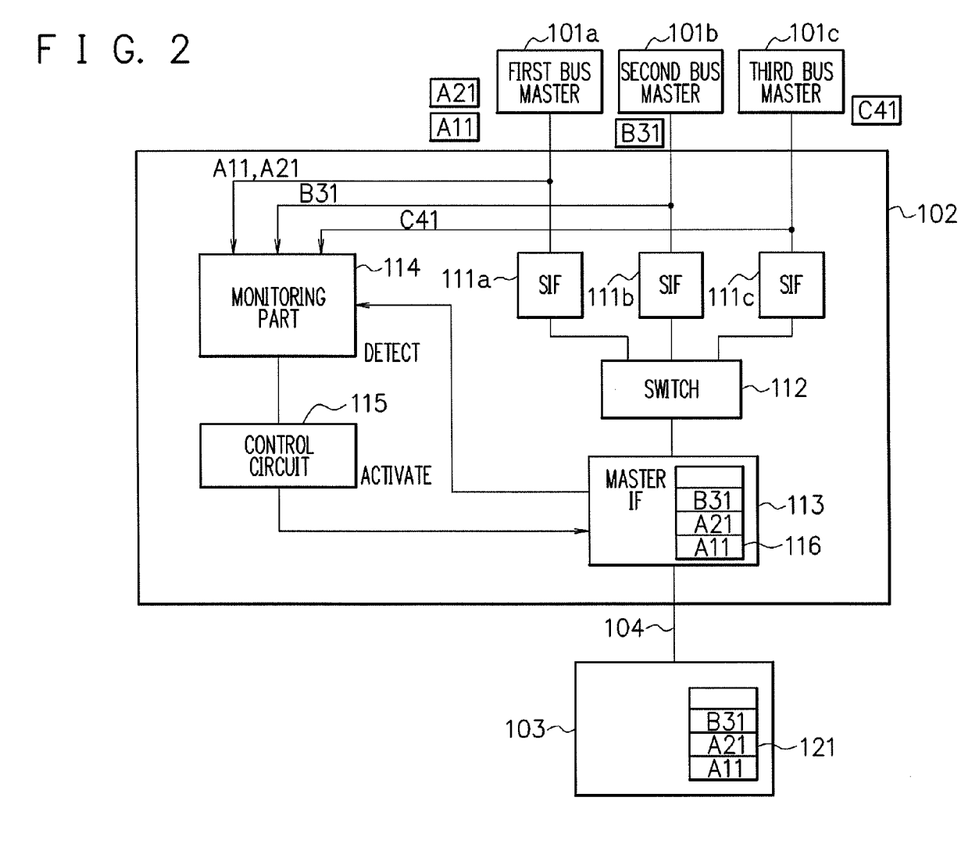
FIG. 2 is a diagram illustrating an example of a processing method of the processing system in FIG. 1.

FIG. 2 to FIG. 6 are diagrams illustrating an example of a processing method of the processing system in FIG. 1. First, as illustrated in FIG. 2, the first bus master circuit 101a issues a low-priority transaction A11. Then, the slave interface circuit 111a transmits the transaction A11 to the first switch circuit 112. Then, the first switch circuit 112 outputs the transaction A11 to the master interface circuit 113. Then, the master interface circuit 113 buffers the transaction A11 in the first buffer 116 and outputs the transaction A11 to the bus slave circuit 103. Then, the bus slave circuit 103 buffers the transaction A11 in the second buffer 121. The second buffer 121 buffers the transactions input from the master interface circuit 113 on a first-in-first-out (FIFO) basis.

Next, the first bus master circuit 101a issues a low-priority transaction A21. Then, the slave interface circuit 111a transmits the transaction A21 to the first switch circuit 112. Then, the first switch circuit 112 outputs the transaction A21 to the master interface circuit 113. Then, the master interface circuit 113 buffers the transaction A21 in the first buffer 116, and outputs the transaction A21 to the bus slave circuit 103. Then, the bus slave circuit 103 buffers the transaction A21 in the second buffer 121.

Next, the second bus master circuit 101b issues a low-priority transaction B31. Then, the slave interface circuit 111b transmits the transaction B31 to the first switch circuit 112. Then, the first switch circuit 112 outputs the transaction B31 to the master interface circuit 113. Then, the master interface circuit 113 buffers the transaction B31 in the first buffer 116, and outputs the transaction B31 to the bus slave circuit 103. Then, the bus slave circuit 103 buffers the transaction B31 in the second buffer 121.

Here, an advantage of providing the second buffer 121 will be described. When the second buffer 121 is not provided, the master interface circuit 113 first outputs only the transaction A11 to the slave circuit 103. Upon receiving the transaction being a read request, the bus slave circuit 103 reads data corresponding thereto, and outputs a processing completion signal together with the read data to the master interface circuit 113. Thereafter, the master interface circuit 113 outputs the next transaction A21 to the slave circuit 103. Upon receiving the transaction A21 being a read request, the bus slave circuit 103 reads data corresponding thereto, and outputs a processing completion signal together with the read data to the master interface circuit 113. Thereafter, the master interface circuit 113 outputs the next transaction B31 to the slave circuit 103. Upon receiving the transaction B31 being a read request, the bus slave circuit 103 reads data corresponding thereto, and outputs a processing completion signal together with the read data to the master interface circuit 113.

On the other hand, when the second buffer 121 is provided, without waiting for the bus slave circuit 103 to complete the processing of the transaction, the master interface circuit 113 is capable of outputting the next transaction to the bus slave circuit 103, which has an advantage that use efficiency of a bus 104 can be improved.

Note that the description will be given on assumption that the bus slave circuit 103 has not yet completed the processing of the transactions A11, A21, B31 in the state in FIG. 2.

Next, the third bus master circuit 101c issues a high-priority transaction C41. Then, the monitoring part 114 detects that the condition that the transaction C41 input from the third bus master circuit 101c is higher in priority than the transactions A11, A21, B31 in the first buffer 116 is satisfied, and activates the control circuit 115. Then, the control circuit 115 controls the master interface circuit 113.

Figure 3:
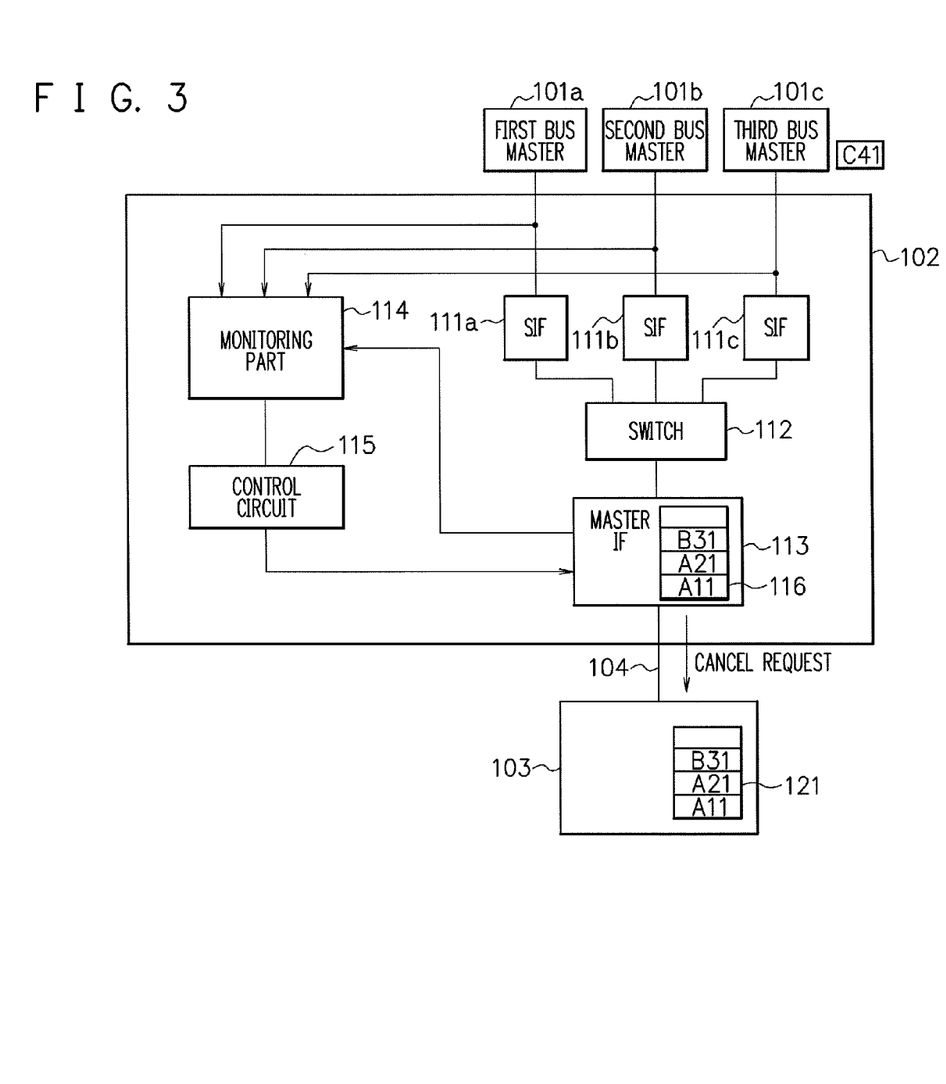
FIG. 3 is a diagram illustrating the example of the processing method of the processing system in FIG. 1.

Next, as illustrated in FIG. 3, under the control by the control circuit 115, the master interface circuit 113 outputs, to the bus slave circuit 103, cancel requests of the transactions A11, A21, A31 which are in the first buffer 116 and are lower in priority than the transaction C41 output from the third bus master circuit 101c.

Next, an example of the aforesaid cancel request will be described. The bus 104 is connected between the arbitration circuit 102 and the bus slave circuit 103. The specification of the bus 104 is not limited but an example where the bus 104 has an AXI specification will be described. In this case, an ARCANCEL signal is added in a read address channel, and an AWCANCEL signal is added in a write address channel. When the cancellation of the already issued transactions A11, A21, B31 being the read requests is requested, the ARCANCEL signals in the read address channel which correspond to the transactions A11, A21, B31 respectively are set to "1". Further, when the cancellation of the already issued transactions A11, A21, B31 being the write requests is requested, the AWCANCEL signals in the write address channel which correspond to the transactions A11, A21, B31 respectively are set to "1". Incidentally, when a transaction being a read request is issued, the ARCANCEL signal in the read address channel is set to "0". Further, when a transaction being a write request is issued, the AWCANCEL signal in the write address channel is set to "0".

Figure 4:
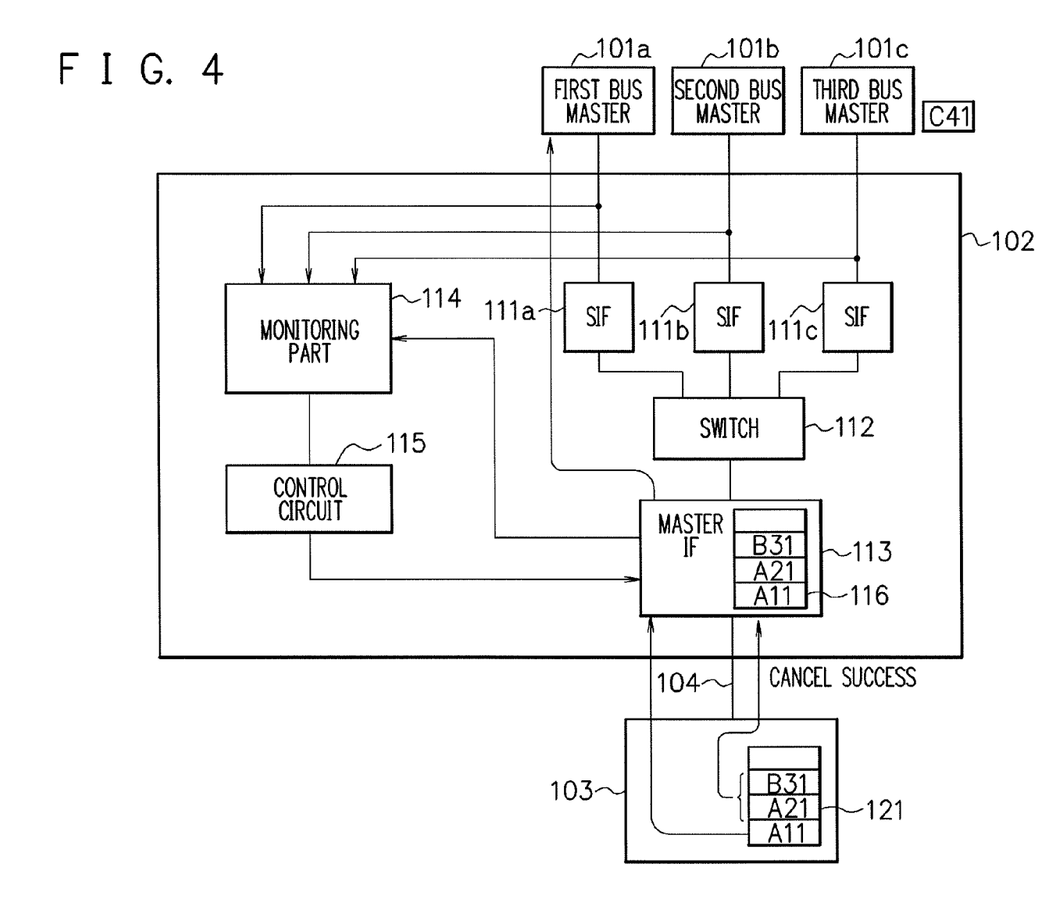
FIG. 4 is a diagram illustrating the example of the processing method of the processing system in FIG. 1.

Next, as illustrated in FIG. 4, the bus slave circuit 103 receives the cancel requests of the transactions A11, A21, B31, does not cancel the transaction A11 because the transaction A11 is under processing, and deletes (cancels) the transactions A21 and B31 from the second buffer 121 because the transactions A21 and B31 have not been processed yet. Next, the bus slave circuit 103 outputs signals indicating cancel successes of the transactions A21 and B31 to the master interface circuit 113. Further, after finishing the processing of the transaction A11 under processing, the bus slave circuit 103 deletes the transaction A11 from the second buffer 121, and outputs a signal indicating a processing end (completion) of the transaction A11 to the master interface circuit 113.

Next, an example of the signal indicating the cancel success and the signal indicating the processing completion which are described above will be described. When the bus 104 has the AXI specification, a RRESP signal in a read data channel is extended from 2 bits to 3 bits, and a BRESP signal in a write response channel is extended from 2 bits to 3 bits. When the cancellation of the transactions A21 and B31 being the read requests is successful, the RRESP signals in the read data channel are set to "100", thereby enabling to transmit the signals indicating the cancel successes to the master interface circuit 113. Further, when the cancellation of the transactions A21 and B31 being the write requests is successful, the BRESP signals in the write response channel are set to "100", thereby enabling to transmit the signals indicating the cancel successes to the master interface circuit 113.

Note that, as for the RRESP signal and the BRESP signal, "000" indicates a success (OKAY) of a read request or a write request, "001" indicates a success (EXOKAY) of an exclusive read request or an exclusive write request, "010" indicates an error (SLVERR) of the bus slave circuit 103, and "011" indicates a decode error (DECERR) when a non-accessible address is used.

Upon receiving the signal indicating the processing end of the transaction A11 from the bus slave circuit 103, the master interface circuit 113 deletes the transaction A11 whose processing is finished from the first buffer 116, and outputs the signal indicating the processing end of the transaction A11 to the first bus master circuit 101a via the first switch circuit 112 and the slave interface circuit 111a. Incidentally, when the transaction A11 is a read request, the bus slave circuit 103 reads data at an address corresponding to the transaction A11 from the memory, and outputs the read data together with the processing end signal to the first bus master circuit 101a via the master interface circuit 113, the first switch circuit 112, and the slave interface circuit 111a.

Figure 5:
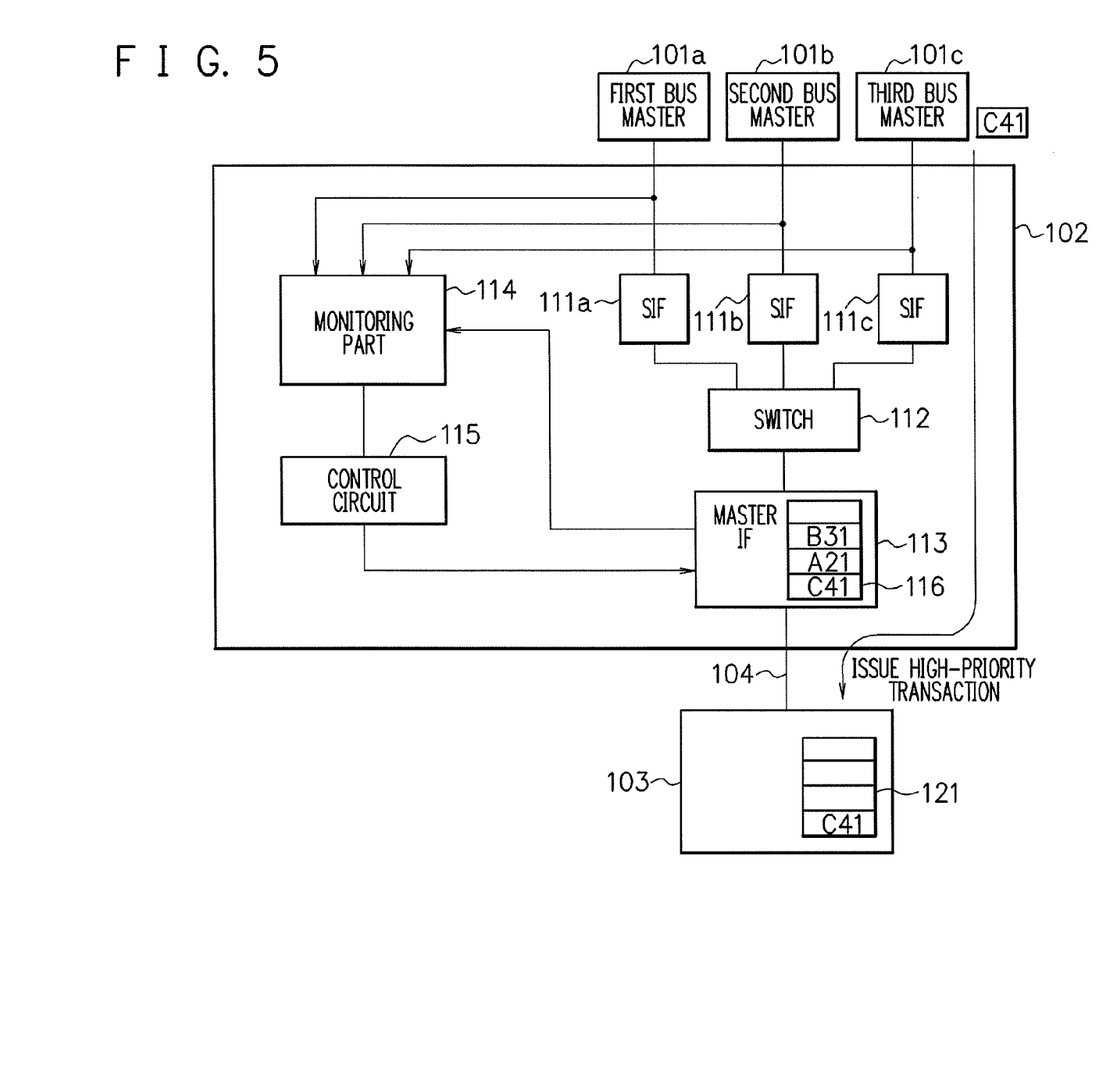
FIG. 5 is a diagram illustrating the example of the processing method of the processing system in FIG. 1.

As illustrated in FIG. 5, the slave interface circuit 111c receives the high-priority transaction C41 from the third bus master circuit 101c, and outputs the transaction C41 to the master interface circuit 113 via the first switch circuit 112. Upon receiving the signals indicating the cancel successes of the transactions A21 and B31 from the bus slave circuit 103, the master interface circuit 113 buffers the high-priority transaction C41 output from the third bus master circuit 101c, in the first buffer 116 before the transactions A21 and B31, and outputs the transaction C41 to the bus slave circuit 103. Then, the bus slave circuit 103 buffers the input transaction C41 in the second buffer 121.

Figure 6:
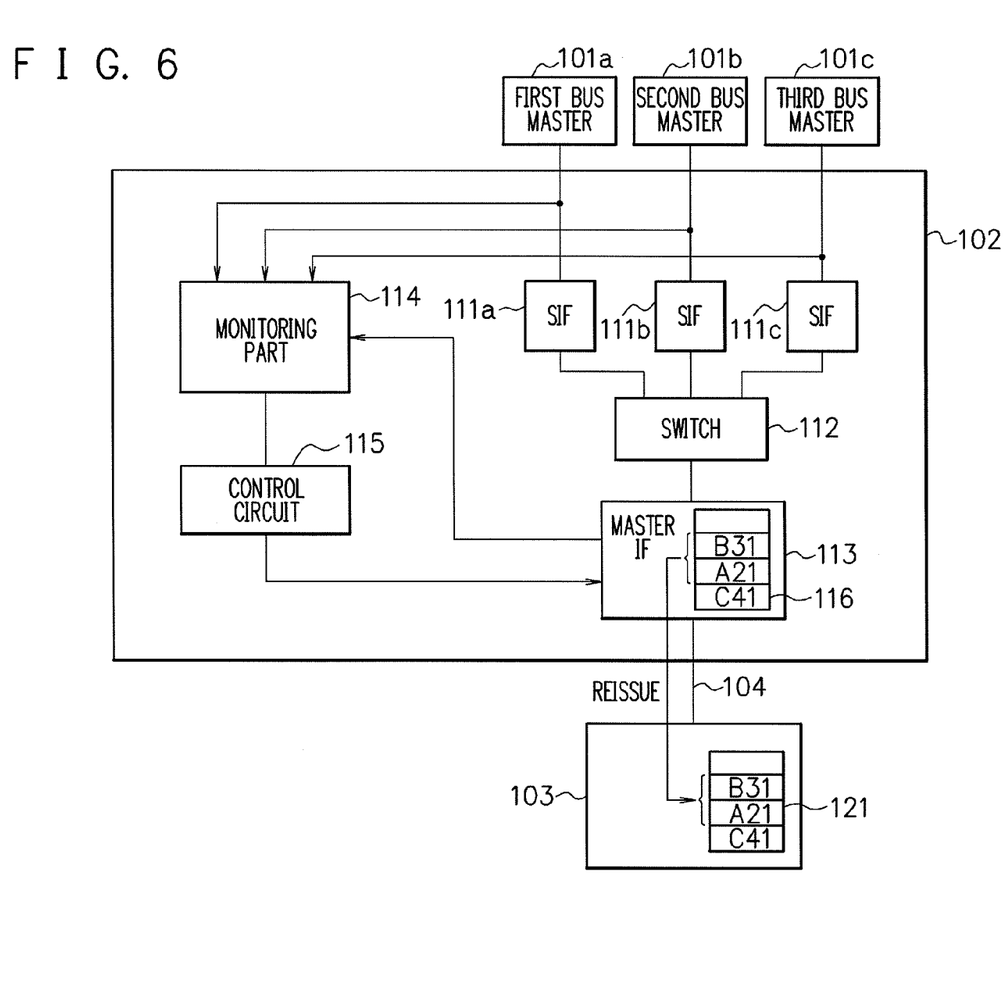
FIG. 6 is a diagram illustrating the example of the processing method of the processing system in FIG. 1.

Next, as illustrated in FIG. 6, the master interface circuit 113 sequentially re-issues the aforesaid transactions A21 and B31 whose cancellation is successful to the bus slave circuit 103. Then, the bus slave circuit 103 sequentially buffers the input transactions A21 and B31 in the second buffer 121. Thereafter, the bus slave circuit 103 first processes the high-priority transaction C41, next processes the low-priority transaction A21, and next processes the low-priority transaction B31. Consequently, it is possible to cause the execution of the high-priority transaction C41 in precedence over the low-priority transactions A21 and B31 which are issued first.

Figure 7:
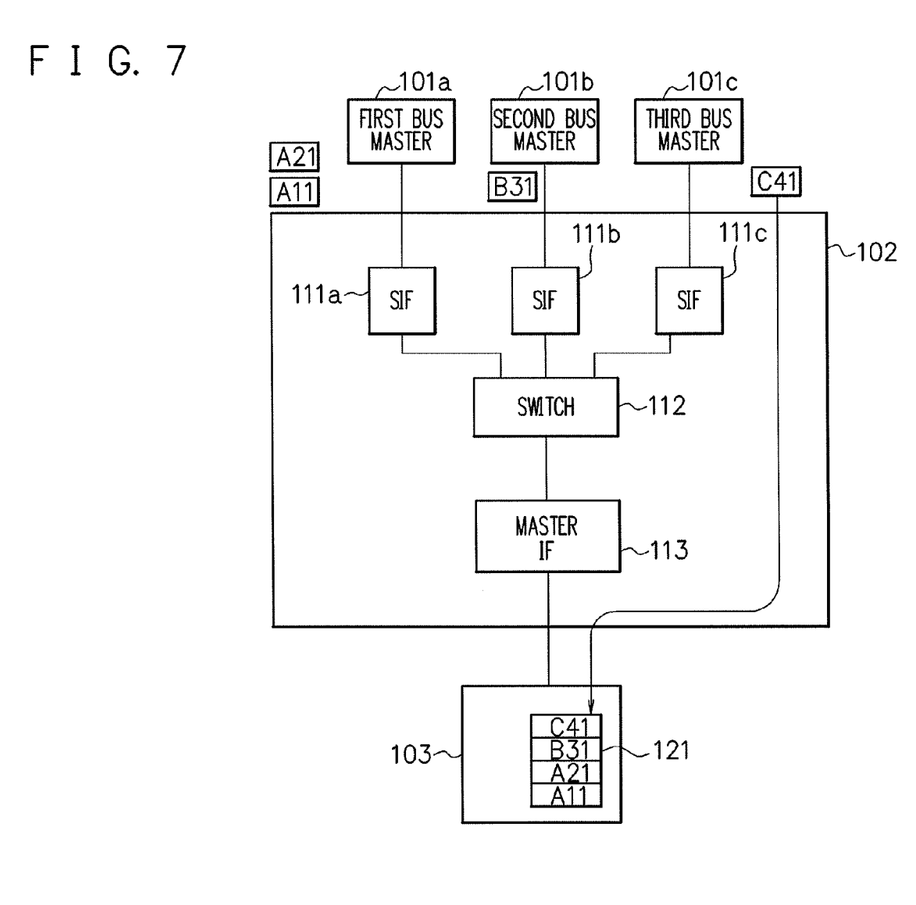
FIG. 7 is an explanatory diagram of the operation when the processing system in FIG. 1 does not have a monitoring part, a control part, and a first buffer.

FIG. 7 is an explanatory diagram of the operation when the monitoring part 114, the control part 115, and the first buffer 116 are not provided in the processing system in FIG. 1. First, the first bus master circuit 101a issues the low-priority transaction A11. Then, the transaction A11 is buffered in the second buffer 121 in the bus slave circuit 103 via the slave interface circuit 111a, the first switch circuit 112, and the master interface circuit 113.

Next, the first bus master circuit 101a issues the low-priority transaction A21. Then, the transaction A21 is buffered in the second buffer 121 in the bus slave circuit 103 via the slave interface circuit 111a, the first switch circuit 112, and the master interface circuit 113.

Next, the second bus master circuit 101b issues the low-priority transaction B31. Then, the transaction B31 is buffered in the second buffer 121 in the bus slave circuit 103 via the slave interface circuit 111b, the first switch circuit 112, and the master interface circuit 113.

Next, the third bus master circuit 101c issues the high-priority transaction C41. Then, the transaction C41 is buffered in the second buffer 121 in the bus slave circuit 103 via the slave interface circuit 111c, the first switch circuit 112, and the master interface circuit 113.

The bus slave circuit 103 executes the processing of the high-priority transaction C41 after finishing the processing of the low-priority transactions A11, A21, B31. The processing of the high-priority transaction C41 is kept on standby until the processing of the low-priority transactions A11, A21, B31 is finished. In this case, the high-priority transaction C41 is not executed at once, and the priority becomes meaningless.

On the contrary, in the processing system in FIG. 1 to FIG. 6, since it is possible to cancel the transactions A21 and B31 issued before the high-priority transaction C41, it is possible to cause the execution of the high-priority transaction C41 in precedence over the low-priority transactions A21 and B31 which are issued first. Further, by canceling the low-priority transactions A21 and B31, it is possible to immediately execute the high-priority transaction C41.

Here, an example where the bus slave circuit 103 is a DDR (Double-Data-Rate) memory circuit having the second buffer 121 capable of buffering four transactions will be described. For example, the bus slave circuit 103 is capable of performing increment transfer of data whose data size is 128 bits and burst length is 4, for one transaction in 150 cycles. In the processing system in FIG. 7, the processing of a high-priority transaction is started after a waiting time of 150×4=600 cycles at the maximum which is required for processing the four low-priority transactions in the second buffer 121.

On the other hand, in the processing system in FIG. 1 to FIG. 6, it is possible to start the processing of a high-priority transaction after a waiting time of 15×4=60 cycles which is required for the cancellation operation of the four low-priority transactions in the second buffer 121, assuming that the number of cycles required for the cancellation operation of one transaction is, for example, 15 cycles. The processing system in FIG. 1 to FIG. 6 is capable of executing the high-priority transaction immediately as compared with the processing system in FIG. 7.

Incidentally, the second buffer 121 in the bus slave circuit 103 may hold a transaction under processing or may hold only a transaction that has not yet been processed.

Second Embodiment

Figure 8:
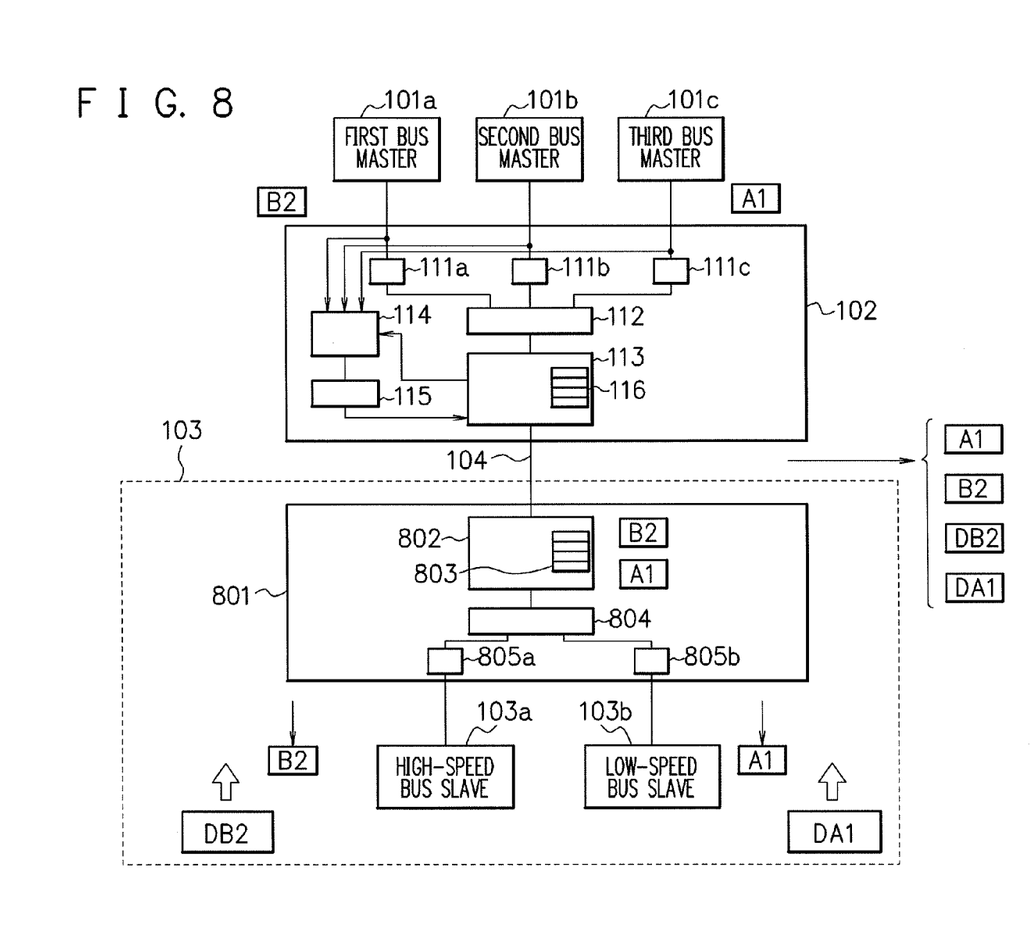
FIG. 8 is a diagram illustrating a configuration example of a processing system according to a second embodiment.

FIG. 8 is a diagram illustrating a configuration example of a processing system according to a second embodiment. This embodiment (FIG. 8) is different from the first embodiment (FIG. 1) in a slave circuit 103. Hereinafter, differences of this embodiment from the first embodiment will be described. The bus slave circuit 103 has a bus bridge circuit 801 and a plurality of slaves 103a, 103b. The bus bridge circuit 801 has a slave interface circuit 802, a second switch circuit 804, and master interface circuits 805a, 805b, and is connected between the plural slaves 103a, 103b and a master interface circuit 113. The slave interface circuit 802 has a second buffer 803. The second buffer 803 corresponds to the second buffer 121 in FIG. 1. Similarly to the first embodiment, the master interface circuit 113 is capable of outputting a cancel request of a low-priority transaction issued before a high-priority transaction to the second buffer 803.

The slave interface circuit 802, similarly to the bus slave circuit 103 of the first embodiment, performs the control over the second buffer 803 and the input/output processing to/from the master interface circuit 113. The second buffer 803 outputs buffered transactions to the second switch circuit 804 on a first-in-first-out basis. The second switch circuit 804 is connected between the slave interface circuit 802 and the plural master interface circuits 805a, 805b, and out of the transactions input from the slave interface circuit 802, the second switch circuit 804 outputs a transaction for the high-speed bus slave (first bus slave) 103a to the master interface circuit 805a and outputs a transaction for the low-speed bus slave (second bus slave) 103b to the master interface circuit 805b.

When the bus slaves 103a and 103b are memory circuits, a transaction is a read request including a read address or a write request including a write address. An address range of the high-speed bus slave 103a and an address range of the low-speed bus slave 103b are different from each other. Therefore, based on the read address or the write address in the transaction, the second switch circuit 804 is capable of determining whether the relevant transaction is a transaction for the high-speed bus slave 103a or a transaction for the low-speed bus slave 103b.

The master interface circuit 805a transmits the transaction input from the second switch circuit 804 to the high-speed bus slave 103a. The master interface circuit 805b transmits the transaction input from the second switch circuit 804 to the low-speed bus slave 103b. The high-speed bus slave 103a is, for example, a high-speed memory circuit and processes the input transaction. The low-speed bus slave 103b is, for example, a low-speed memory circuit and processes the input transaction. Providing the second buffer 803 in the slave interface circuit 802 eliminates a need for providing a buffer in the high-speed bus slave 103a and the low-speed bus slave 103b.

Next, an advantage of providing the second buffer 803 will be described. For example, a third bus master circuit 101c first issues a high-priority transaction A1. The transaction A1 is buffered in the second buffer 803 via an arbitration circuit 102 as in the first embodiment. Next, a first bus master circuit 101a issues a low-priority transaction B2. The transaction B2 is buffered in the second buffer 803 via the arbitration circuit 102 as in the first embodiment. Since the low-priority transaction B2 is lower in priority than the high-priority transaction A1 issued first, the master interface circuit 113 does not output a cancel request to the second buffer 803. First, the second switch circuit 804 outputs the transaction A1 to the low-speed bus slave 103b via the master interface circuit 805b. Next, the second switch circuit 804 outputs the transaction B2 to the high-speed bus slave 103a via the master interface circuit 805a. The low-speed bus slave 103b processes the input transaction A1. The high-speed bus slave 103a processes the input transaction B2. The processing speed of the high-speed bus slave 103a is high, and the processing speed of the low-speed bus slave 103b is low. Therefore, the processing of the high-speed bus slave 103a is first finished, and the high-speed bus slave 103a outputs an end signal (response) DB2 of the transaction B2. The end signal DB2 is output to the first bus master circuit 101a via the bus bridge circuit 801 and the arbitration circuit 102. Next, the processing of the low-speed bus slave 103b is finished, and the low-speed bus slave 103b outputs an end signal (response) DA1 of the transaction A1. The end signal DA1 is output to the third bus master circuit 101c via the bus bridge circuit 801 and the arbitration circuit 102.

As described above, the master interface circuit 113 first outputs the transaction A1, next outputs the transaction B2, next receives the end signal DB2 of the transaction B2, and next receives the end signal DA1 of the transaction A1. Consequently, the master interface circuit 113 is capable of issuing the next transaction B2 without waiting for the end signal DA1 of the transaction A1.

Figure 9:
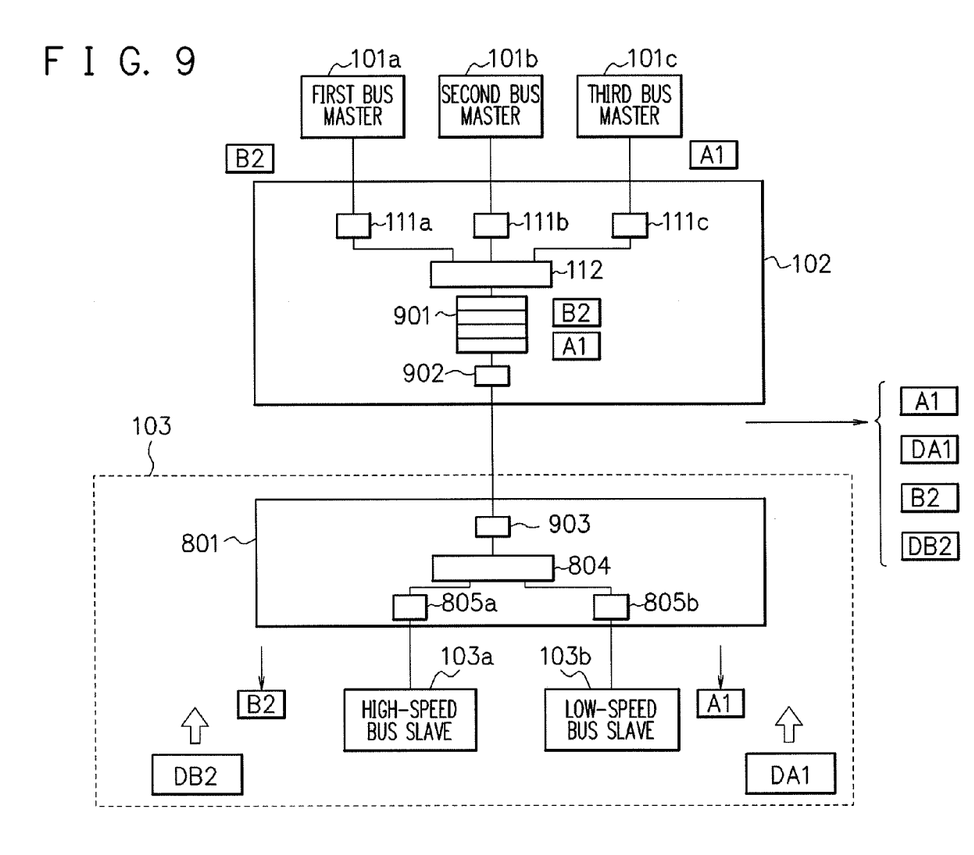
FIG. 9 is a diagram illustrating a processing system in which a monitoring part, a control circuit, and a second buffer are deleted in the processing system in FIG. 8.

FIG. 9 is a diagram illustrating a processing system in which a monitoring part 114, a control circuit 115, and the second buffer 803 are deleted in the processing system in FIG. 8. The processing system in FIG. 9 has a slave interface circuit 903 having no buffer instead of the slave interface circuit 802 having the second buffer 803 in the processing system FIG. 8. Further, a buffer 901 is connected between a first switch circuit 112 and a master interface circuit 902. The master interface circuit 902 does not have a first buffer 116 in FIG. 8.

Next, an operation example of the processing system in FIG. 9 will be described. For example, the third bus master circuit 101c first issues the high-priority transaction A1. The transaction A1 is buffered in the buffer 901 via a slave interface circuit 111c and the first switch circuit 112. Next, the first bus master circuit 101a issues the low-priority transaction B2. The transaction B2 is buffered in the buffer 901 via a slave interface circuit 111a and the first switch circuit 112. The master interface circuit 902 outputs the transaction A1 in the buffer 901 to the low-speed bus slave 103b via the bus bridge circuit 801. The low-speed bus slave 103b processes the input transaction A1. Since the processing speed of the low-speed bus slave 103b is low, the processing time of the low-speed bus slave 103b is long. When finishing the processing of the transaction A1, the low-speed bus slave 103b outputs the end signal DA1 of the transaction A1. The end signal DA1 is output to the third bus master circuit 101c via the bus bridge circuit 801 and the arbitration circuit 102. When receiving the end signal DA1, the master interface circuit 902 outputs the next transaction B2 in the buffer 901 to the high-speed bus slave 103a via the bus bridge circuit 801. The high-speed bus slave 103a processes the input transaction B2. Since the processing speed of the high-speed bus slave 103a is high, the processing time of the high-speed bus slave 103a is short. When finishing the processing of the transaction B2, the high-speed bus slave 103a outputs the end signal DB2 of the transaction B2. The end signal DB2 is output to the first bus master circuit 101a via the bus bridge circuit 801 and the arbitration circuit 102.

As described above, the master interface circuit 902 first outputs the transaction A1, next receives the end signal DA1 of the transaction A1, next outputs the transaction B2, and next receives the end signal DB2 of the transaction B2. In this case, after waiting for the low-speed bus slave 103b to finish the processing of the transaction A1, the high-speed bus slave 103a starts processing the transaction B2. Therefore, the start and end of the processing of the transaction B2 are delayed.

On the other hand, in the processing system in FIG. 8, the master interface circuit 113 first outputs the transaction A1, next outputs the transaction B2, next receives the end signal DB2 of the transaction B2, and next receives the end signal DA1 of the transaction A1, as described above. Consequently, without waiting for the end signal DA1 of the transaction A1 of the low-speed bus slave 103b, the high-speed bus slave 103a is capable of starting the processing of the transaction B2. Consequently, it is possible to start and end the processing of the transaction B2 earlier, leading to an improvement of performance of the processing system.

Incidentally, the example where the priorities of transactions are priorities of the bus master circuits 101a to 101c that output the relevant transactions is described, but this is not restrictive. The priorities of transactions may be priorities of the bus slaves 103a, 103b being output destinations of the relevant transactions. For example, a priority of a transaction whose output destination is the high-speed bus slave 103a can be set high, and a priority of a transaction whose output destination is the low-speed bus slave 103b can be set low. Further, when three or more bus slaves are connected to the second switch circuit 804, priorities on three steps or more can be assigned to the three bus slaves or more. In this case, based on a read address or a write address in a transaction, the master interface circuit 113, similarly to the above, is capable of determining the priorities of the transactions. Further, information on the priorities of transactions may be given in the transactions irrespective of the priorities of the bus master circuits 101a to 101c and the bus slaves 103a, 103b.

The above-described embodiments all merely illustrate concrete examples in implementing the present invention, but the technical scope of the present invention should not be construed by these in a limited manner. That is, the present invention can be implemented in various forms without departing from its technical idea or its main features.

The processing by the interface circuit makes it possible to execute a high-priority transaction in precedence over a low-priority transaction issued first.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arbitration circuit comprising:
an interface circuit configured to store transactions output from a plurality of master circuits in a first-in-first-out type first buffer and outputs the stored transactions stored in the first buffer to a slave circuit; and
a control circuit configured to control the interface circuit based on results of monitoring the transactions output from the plural master circuits, wherein,
when a high-priority transaction higher in priority than one of the stored transactions is output from one of the plural master circuits, the interface circuit outputs, according to the control by the control circuit, a cancel request of a low-priority transaction whose priority is lower than the priority of the high-priority transaction and which is included in the stored transactions, to a first-in-first-out type second buffer which is in the slave circuit and in which the same transactions as the stored transactions are stored, and when the cancel request is successful, the interface circuit outputs the high-priority transaction to the slave circuit, and outputs the low-priority transaction whose cancel request is successful to the slave circuit after outputting the high-priority transaction to the slave circuit.

2. The arbitration circuit according to claim 1, wherein, upon receiving the cancel request, when the low-priority transaction has not yet been processed, the slave circuit deletes the low-priority transaction from the second buffer, and outputs a signal indicating the success of the cancel request to the interface circuit.

3. The arbitration circuit according to claim 1, wherein:
upon receiving the cancel request, when the low-priority transaction is under processing, the slave circuit outputs a signal indicating a processing end of the low-priority transaction to the interface circuit after finishing the processing of the low-priority transaction; and
upon receiving the signal indicating the processing end of the low-priority transaction from the slave circuit, the interface circuit deletes the transaction whose processing is finished from the first buffer.

4. The arbitration circuit according to claim 1, further comprising a first switch circuit connected between the plural master circuits and the first buffer.

5. The arbitration circuit according to claim 1, wherein the slave circuit comprises:
a plurality of slaves; and
a bridge circuit connected between the plural slaves and the interface circuit.

6. The arbitration circuit according to claim 5, wherein the bridge circuit has the second buffer.

7. The arbitration circuit according to claim 6, wherein the bridge circuit has a second switch circuit connected between the plural slaves and the second buffer.

8. The arbitration circuit according to claim 1, wherein the priorities of the transactions are priorities of the plural master circuits outputting the transactions.

9. The arbitration circuit according to claim 5, wherein the priorities of the transactions are priorities of the plural slaves which are output destinations of the transactions.

10. A processing method of an arbitration circuit comprising:
storing transactions output from a plurality of master circuits, in a first-in-first-out type first buffer in an interface circuit;
outputting the stored transactions stored in the first buffer to a slave circuit;
when a high-priority transaction higher in priority than one of the stored transactions is output from one of the plural master circuits, outputting a cancel request of a low-priority transaction whose priority is lower than the high-priority transaction and which is included in the stored transactions, to a first-in-first-out type second buffer which is in the slave circuit and in which the same transactions as the stored transactions are stored;
when the cancel request is successful, outputting the high-priority transaction to the slave circuit; and
after outputting the high-priority transaction to the slave circuit, outputting the low-priority transaction whose cancel request is successful to the slave circuit.

* * * * *